US006181343B1

(12) United States Patent
Lyons

(10) Patent No.: US 6,181,343 B1
(45) Date of Patent: Jan. 30, 2001

(54) SYSTEM AND METHOD FOR PERMITTING THREE-DIMENSIONAL NAVIGATION THROUGH A VIRTUAL REALITY ENVIRONMENT USING CAMERA-BASED GESTURE INPUTS

(75) Inventor: Damian M. Lyons, Putnam Valley, NY (US)

(73) Assignee: Philips Electronics North America Corp., New York, NY (US)

( * ) Notice: Under 35 U.S.C. 154(b), the term of this patent shall be extended for 0 days.

(21) Appl. No.: 08/996,678

(22) Filed: Dec. 23, 1997

(51) Int. Cl.$^7$ .................................................. G06F 15/00
(52) U.S. Cl. ............................................ 345/358; 345/355
(58) Field of Search ................................... 345/358, 473, 345/355; 348/42, 43, 44, 46, 51, 53

(56) References Cited

U.S. PATENT DOCUMENTS

| 5,495,576 | * | 2/1996 | Ritchey | ................................. | 395/125 |
| 5,563,988 | | 10/1996 | Maes et al. . | | |
| 5,594,469 | * | 1/1997 | Freeman et al. | ..................... | 345/358 |
| 5,617,312 | | 4/1997 | Iura et al. . | | |
| 5,714,997 | * | 2/1998 | Anderson | ............................... | 348/39 |
| 5,745,126 | * | 4/1998 | Jain et al. | .............................. | 348/42 |
| 5,872,575 | * | 2/1999 | Segal | .................................... | 345/473 |

FOREIGN PATENT DOCUMENTS

| 07038873A | 2/1995 | (JP) | ................................. | H04N/7/15 |
| WO9621321 | 7/1996 | (WO) | ............................ | H04N/13/04 |

OTHER PUBLICATIONS

Wren, Christopher et al., Pfinder: Real–Time Tracking of hte Human Body, MIT Media Laboratory Perceptual Computing Section Technical Report No. 353, pp. 1–9, 1995.*

Carolina Cruz–Nelra, "The Cave Audio Visual Experience Automatic Virtual Environment", p. 65, Line 70–Line 72; Communication of the ACM pp. 64–72, vol. 35, No. 6, Jun. 1992.

* cited by examiner

Primary Examiner—Raymond J. Bayerl
Assistant Examiner—Cao H. Nguyen
(74) Attorney, Agent, or Firm—Gregory L. Thorne

(57) ABSTRACT

A system and method for permitting three-dimensional navigation through a virtual reality environment using camera-based gesture inputs of a system user. The system comprises a computer-readable memory, a video camera for generating video signals indicative of the gestures of the system user and an interaction area surrounding the system user, and a video image display. The video image display is positioned in front of the system user. The system further comprises a microprocessor for processing the video signals, in accordance with a program stored in the computer-readable memory, to determine the three-dimensional positions of the body and principle body parts of the system user. The microprocessor constructs three-dimensional images of the system user and interaction area on the video image display based upon the three-dimensional positions of the body and principle body parts of the system user. The video image display shows three-dimensional graphical objects within the virtual reality environment, and movement by the system user permits apparent movement of the three-dimensional objects displayed on the video image display so that the system user appears to move throughout the virtual reality environment.

5 Claims, 8 Drawing Sheets

SYSTEM AND METHOD FOR PERMITTING THREE-DIMENSIONAL NAVIGATION THROUGH A VIRTUAL REALITY ENVIRONMENT USING CAMERA-BASED GESTURE INPUTS

BACKGROUND OF THE INVENTION

A. Field of the Invention

The present invention relates generally to multimedia and virtual reality applications, and, more particularly to a system and method for permitting three-dimensional navigation through a virtual reality environment using camera-based gesture inputs.

B. Description of the Related Art

Multimedia and virtual reality applications permit exciting interaction between a user and a computer. Unfortunately, current computer/user interfaces present a barrier to simplistic user interactivity and thus, consumer acceptance of multimedia and virtual reality applications. Ideally, computer/user interfaces would combine an intuitive interaction format with a broad range of interaction capabilities. Practically, however, these two features conflict. For example, a computer keyboard offers broad interaction capabilities but is not intuitive, whereas a television remote control is more intuitive but offers limited interaction capabilities. Even more flexible interfaces, such as an instrumented body suit, can be both cumbersome and expensive.

In virtual reality applications, the two primary computer/user interface approaches to displaying and interacting with the virtual reality environment comprise an immersive approach and a non-immersive approach. In the immersive approach, the user wears a head-mounted display, as well as tracking devices attached to the head and one or more limbs. A computer displays a virtual reality environment on head-mounted display by displaying synthetic visual images to the user's eyes, and changes the images based upon the information received from the head tracking device. The limb tracking devices permit user interaction with the virtual reality environment. The immersive approach provides the advantage of giving the user the impression of being "in" the virtual reality environment. Unfortunately, the immersive approach provides the disadvantage of isolating the user from his/her real environment, leaving the user unaware of health and safety dangers in the real environment.

In the non-immersive approach, the computer displays visual images of the virtual environment on a stationary display, such as a computer monitor or television screen. The user changes the perspective of the visual images using a computer keyboard, mouse, joystick or other similar devices as an interface with the computer. The non-immersive approach provides the advantage of allowing the user to interact with the virtual reality environment without isolating the user from his/her real environment. However, the non-immersive approach fails to give the user the impression of being "in" the virtual reality environment.

A number of approaches to computer/user interface design have been suggested to address the trade-offs between the immersive and non-immersive approaches. One approach uses a video camera in a non-invasive way to measure the gestures of a system user, so to control the images displayed to the system user. As shown in FIG. 1, such an interface system 10 comprises a blue wall 12 in which a user 14 stands in front of, permitting two-dimensional silhouette extraction of user 14 and chromakeying of the silhouette. System 10 further includes a video camera 16 for identifying the two-dimensional, user silhouette and for producing a video signal. A microprocessor 18 of a computer identifies the two-dimensional, user silhouette seen by video camera 16, but only as a two-dimensional shape. Thus, motions of user 14 are only understood by microprocessor 18 in terms of the changing image coordinates of the silhouette. Microprocessor 18 displays an image of user 14 on a television display 20. The image displayed on television 20 consists of a two-dimensional scene into which the user's image has been chromakeyed. User 14 can interact with the displayed scene by adopting a specific pose, e.g., hands-over-head, or by moving so that a portion of the user's silhouette touches a designated set of image coordinates making it appear as if user 14 touched a displayed object.

The interface system shown in FIG. 1 provides an easy-to-use, inexpensive interface with multimedia and virtual reality applications. However, the interface system only permits two-dimensional interaction with computer-displayed objects, restricting the capabilities of the interface to two dimensions. For example, in the two-dimensional system of FIG. 1, all of the computer-displayed objects are at the same depth in the window surrounding the user's silhouette.

As seen in FIG. 2, a conventional two-dimensional silhouette extraction process used by the system shown in FIG. 1, comprises both a hardware process (above the dashed line) and a software process (below the dashed line), wherein computer microprocessor 18 performs the software process steps. The hardware process involves a step 22 of inputting an analog video camera signal, followed by a step 24 of digitizing the analog camera signal to produce a gray-scale binary data signal. The hardware process further comprises a step 26 of adjusting the resolution (high or low) of the video camera, and a step 28 of restricting the camera view to a window of the image of interest, i.e., the user's image. The hardware process next comprises a dynamic threshold step 30 where the gray-scale binary data signal is converted into digital binary data, e.g., "1" or "0." At step 32, the hardware process determines the edges (silhouette) of the user's image, and, based on the edge data, adjusts the picture size (step 34) so to adjust the resolution accordingly at step 26.

The software process involves a first step 36 of subtracting the background from the edge data of step 34, leaving only an image contour of the user's image. The background is a picture of an empty scene as seen by the camera, and is provided at step 38. The software further comprises a step of joining together all of the edge data of the user's image, providing a single contour around the user's image. The software process also comprises an identification step 42 for determining whether the user image contour represents a person, an animal, etc., and a silhouette feature step 44 for identifying the silhouette features (in x, y coordinates) of the user, e.g., head, hands, feet, arms, legs, etc. At step 46, the software process utilizes the contour identification data in order to calculate a bounding box around the user. The bounding box data is provided to the window restricting step 28 for restricting the size of the camera window around the user, and thus, increase the speed of the extraction process.

An alternative approach, proposed by the Media Lab at the Massachusetts Institute of Technology ("MIT"), allows a user to interact with a computer-generated graphical world by using camera-based body motions and gestures of a system user. Such a system, while being amongst the most versatile of its kind currently available, suffers from the following problems: (1) it is based on a standard graphical interface ("SGI") platform; (2) it is sensitive to lighting conditions around the system user; (3) although it tracks the user's foot position in three dimensions, it treats the remainder of the user's body as a two-dimensional object; (4) it is limited to a single user; (5) it provides too coarse of resolution to see user hand details such as fingers; and (6) it is tied to only the "magic mirror" interactive video environment ("IVE") paradigm, described below. Thus, the alternative approach suffers from the same limitations encountered by the conventional two-dimensional approach, as well as many other problems.

Still another approach includes a method for real-time recognition of a human image, as disclosed Japanese Patent Abstract Publication No. 07-038873 ("JP 07-038873"). JP 07-038873 describes three-dimensional graphical generation of a person that detects the expression, rotation of the head, motion of the fingers, and rotation of the human body. However, JP 07-038873 is limited to graphical model generation of the human body. Furthermore, JP 07-38873 focuses on using three-dimensional graphical animation of a user primarily for teleconferencing purposes, wherein the user cannot control objects in a computer-generated scene. Finally, the reference discloses using three-dimensional animation of a remote user for teleconferencing purposes, as opposed to a three-dimensional animation of a local user.

A final approach, as found in International Patent Application (PCT) WO 96/21321 ("PCT 96/21321"), consists of creating a three-dimensional simulation of an event (e.g., a football game), in real-time or storing it on a CD ROM, using cameras and microphones. The system disclosed in PCT 96/21321, however, merely replays three-dimensional scenes of the event as they are viewed by the cameras. Furthermore, users of the PCT 96/21321 system can only change their perspective of the three-dimensional scenes and are unable to control objects in the scenes.

Unfortunately, none of these proposed approaches described above provides a computer/user interface that combines an intuitive interaction format with a broad range of interaction capabilities.

SUMMARY OF THE INVENTION

An object of the present invention is to address the problems encountered by the two-dimensional interface systems and the alternative approaches proposed by the Media Lab at the Massachusetts Institute of Technology and the other related art discussed above.

Another object is to provide a three-dimensional interface for computer users that integrates the advantages of both the immersive and non-immersive approaches to displaying and interacting with a virtual reality environment.

A further object is to provide a three-dimensional display of computer-generated objects so that the objects occupy the three-dimensional space in a virtual reality environment around the computer users and the computer users navigate through and control the objects in the virtual reality environment through normal body movements.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a system for permitting three-dimensional navigation through a virtual reality environment using camera-based gesture inputs of a user of the system, including: a computer-readable memory means; means for generating video signals indicative of the gestures of the system user and an interaction area surrounding the system user; means for displaying video images, the video image display means being positioned in front of the system user; and means for processing the video signals, in accordance with a program stored in the computer-readable memory means, to determine the three-dimensional positions of the body and principle body parts of the system user, wherein the video signal processing means constructs three-dimensional images of the system user and interaction area on the video image display means based upon the three-dimensional positions of the body and principle body parts of the system user, the video image display means displays three-dimensional graphical objects within the virtual reality environment, and movement by the system user permits apparent movement of the three-dimensional objects displayed on the video image display means so that the system user appears to move throughout the virtual reality environment.

To further achieve the objects, the present invention comprises a method for permitting three-dimensional navigation through a virtual reality environment using camera-based gesture inputs of a user of a computer system having a computer-readable memory and video image display connected to a microprocessor using a program stored in the computer-readable memory, the method comprising the steps of: generating video signals indicative of the gestures of the system user and an interaction area surrounding the system user; processing the video signals in the microprocessor to determine the three-dimensional positions of the body and principle body parts of the system user; using the microprocessor to construct three-dimensional images of the system user and interaction area on the video image display based upon the three-dimensional positions of the body and principle body parts of the system user; and utilizing the microprocessor to display on the video image display three-dimensional graphical objects within the virtual reality environment, wherein movement by the system user permits apparent movement by the three-dimensional objects displayed on the video image display so that the system user appears to move throughout the virtual reality environment.

To still further achieve the objects, the present invention comprises a computer-readable memory device for storing a program that permits three-dimensional navigation through a virtual reality environment using camera-based gesture inputs of a user of a computer system having a video image display connected to a microprocessor using instructions stored in the computer-readable memory device, the computer-readable memory device comprising: instructions for processing video signals indicative of gestures of the system user to determine the three-dimensional positions of the body and principle body parts of the system user; instructions for constructing three-dimensional images of the system user and interaction area on the video image display based upon the three-dimensional positions of the body and principle body parts of the system user; and instructions for displaying, on the video image display, three-dimensional graphical objects within the virtual reality environment, wherein movement by the system user permits apparent movement by the three-dimensional objects displayed on the video image display so that the system user appears to move throughout the virtual reality environment.

To even further achieve the objects, the present invention comprises a computer program product for permitting three-dimensional navigation through a virtual reality environment using camera-based gesture inputs of a user of a computer system having a video image display connected to a microprocessor, the computer program product comprising: means for processing video signals indicative of gestures of the system user to determine the three-dimensional positions of the body and principle body parts of the system user; means for constructing three-dimensional images of the system user and interaction area on the video image display based upon the three-dimensional positions of the body and principle body parts of the system user; and means for displaying, on the video image display, three-dimensional graphical objects within the virtual reality environment, wherein movement by the system user permits apparent movement by the three-dimensional objects displayed on the video image display so that the system user appears to move throughout the virtual reality environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Figure 1:
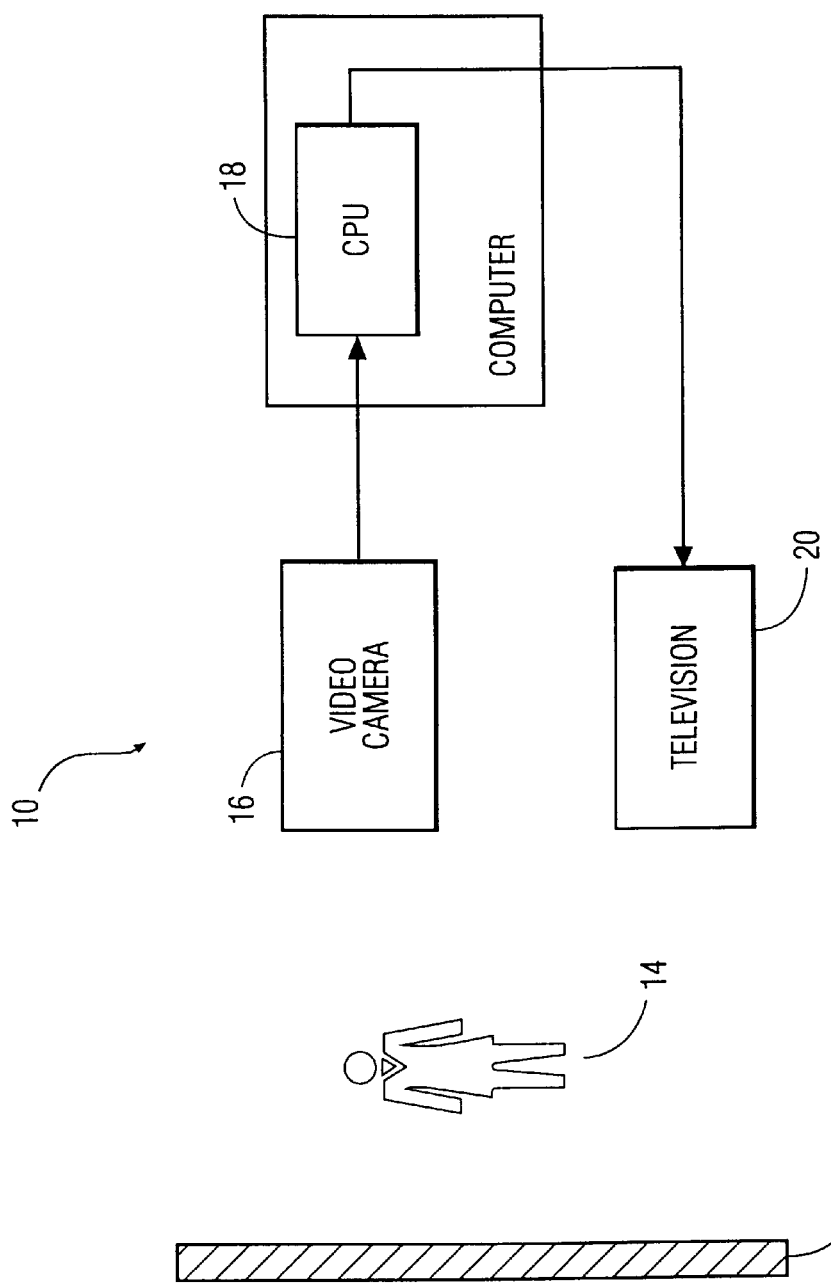
FIG. 1 is a block diagram of a conventional system for constructing two-dimensional images using camera-based silhouettes of users.

Reference will now be made in detail to the present preferred embodiments of the invention, examples of which are illustrated in the accompanying drawings. Wherever possible, the same reference numbers will be used throughout the drawings to refer to the same or like parts.

In accordance with the preferred embodiments, the present invention includes a system and method for permitting three-dimensional navigation through a virtual reality environment using camera-based gesture inputs of system users. The system comprises a computer-readable memory means, means for generating video signals indicative of the gestures of the system users and an interaction area surrounding the system users, and means for displaying video images. The video image display means is positioned in front of the system users. The system further comprises means for processing the video signals, in accordance with a program stored in the computer-readable memory means, to determine the three-dimensional positions of the bodies and principle body parts of the system users, wherein the video signal processing means constructs three-dimensional images of the system users and interaction area on the video image display means based upon the three-dimensional positions of the bodies and principle body parts of the system users, the video image display means displays three-dimensional graphical objects within the virtual reality environment, and movement by the system users causes apparent movement of the three-dimensional objects displayed on the video image display means so that the system user appears to move throughout the virtual reality environment.

In other words, the present invention is drawn to a natural and intuitive computer/user interface based upon computer vision interaction by system users. As used herein, "computer vision" is the use of a computer to interpret information received from a video imaging device in terms of what objects the imaging device sees. Computer vision permits recognition of user gestures, body motions, head motions, eye motions, etc. The recognized user motions, in turn, are used to interact with multimedia and virtual reality applications. Specifically, the present invention takes the system users' silhouettes in two-dimensional image coordinates and projects them into the three-dimensional image coordinates the system users occupy in the interaction area.

Such an approach is undemanding upon the system users and inexpensive to make. If the system users are interacting via a large-screen display, the computer knows where the system users are looking and pointing, etc., and manipulates the information on the display accordingly. Further, the position and pose of the system users in front of the display screen are extracted and used for interaction with a three-dimensional graphical model, i.e., virtual reality environment. The addition of gesture interpretation to the computer vision system of the present invention adds realism to the interaction with the computer. For example, intuitive hand gestures may be used as an interface with the computer system to permit navigation through the virtual reality environment.

Figure 3:
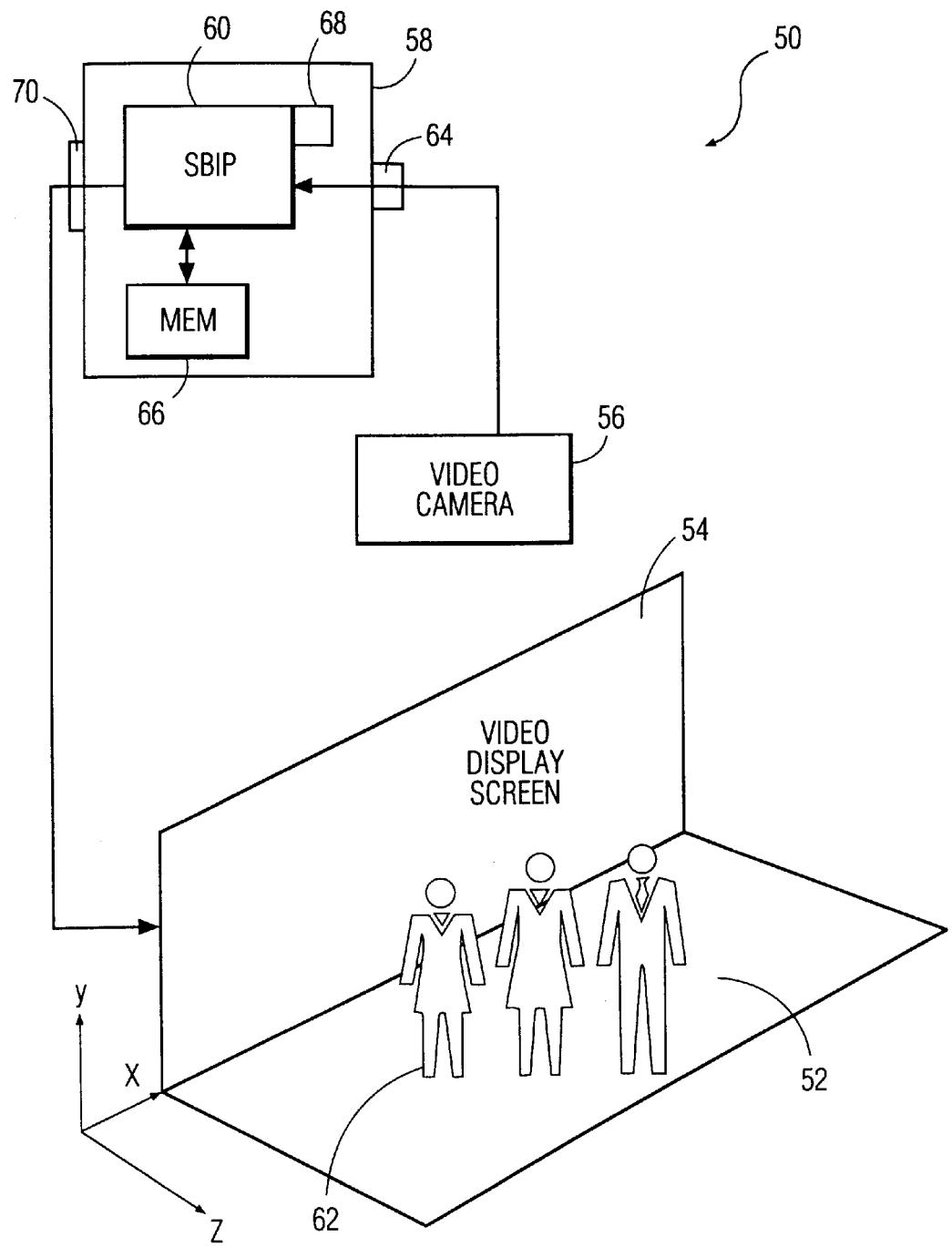
FIG. 3 is a block diagram of a system for constructing three-dimensional images using camera-based gesture inputs of users in accordance with a preferred embodiment of the present invention.

Rather than relying on conventional SGI-based software, the present invention utilizes a camera-based user interface system 50, as best shown in FIG. 3. System 50 comprises a video camera 56, a video display screen 54, and a computer 58 having a Philips® single board image processor (SBIP) 60. SBIP 60 eliminates problems (1)–(3) encountered in the approach proposed by the Media Lab at the Massachusetts Institute of Technology, and thus, also encountered in the two-dimensional systems. Computer 58 also comprises a computer-readable memory 66 encoded with three-dimensional imaging software. SBIP 60 utilizes the software so that system 50 may handle the three-dimensional body motions of the system user. The three-dimensional imaging software of the present invention corrects problems (4) and (5) encountered in the approach proposed by the Media Lab at the Massachusetts Institute of Technology.

To address problem (6) of the Media Lab approach, the present invention provides an interactive video environment ("IVE") capable of evaluating several IVE paradigms other than the "magic mirror" paradigm proposed by Massachusetts Institute of Technology. The present invention is capable of evaluating the following four IVE paradigms: (1) the display shows live video of a camera input of a remote site, and the video camera input of the system users is composited with the live video on the display (this is known as "mirror" effect, as in the MIT approach); (2) the display shows live video of the remote site, and the camera input of the users is not composited with the live video on the display (this is known as "window" effect); (3) the display shows graphical images as in virtual reality, and the camera input of the system users is composited with the graphical images on the display; and (4) the display shows graphical images, and the camera input of the system users is not composited with the graphical images on the display.

A. Detailed Description of the System Hardware of the Preferred Embodiments

As embodied herein, the system and method for permitting three-dimensional navigation through a virtual reality environment using camera-based gesture inputs of the preferred embodiment of the present invention is shown in FIG. 3. Specifically, system 50 comprises a means for processing video signals, such as a computer 58, electrically coupled to a means for generating video signals, such as a video camera 56. Computer 58 is electrically coupled to a means for displaying video images, such as a video display screen 54. Preferably, video display screen 54 is located in front of an interaction area 52 where system users 62 stand. Video camera 56 electronically reads the images of users 62 and interactive area 52, creates video signals corresponding to these images, and provides the video signals to computer 58.

Preferably, computer 58 comprises a typical microprocessor-based computing device such as an IBM-compatible personal computer. Computer 58 further comprises a serial port 64 connected to a microprocessor 60 for receiving the video signals from video camera 56, and a conventional computer-readable memory 66 capable of being encoded with software programs. Microprocessor 60 preferably is a Philips® single board image processor (SBIP). SBIP 60 uses the software (described below), encoded in computer memory 66, for mapping the two-dimensional image features of users 62 and interactive area 52 and calculating the three-dimensional position of system users 62 within interactive area 52. SBIP 60 also may use an application program permanently encoded within computer-readable memory 66, or temporarily encoded therein via an external computer-readable memory, such as for example, a floppy diskette or a CD ROM. Computer 58 further comprises a mode control port 68, connected to SBIP 60 for receiving data from other interactive controls such as a remote control, and a video processor port 70 for delivering video signals to video display screen 54. The software encoded in computer-readable memory 66, and used by SBIP 60, isolates the contours of the system users, determines their body and limb positions in three-dimensional image space, and generates a video signal corresponding to the body and limb position to video display screen 54.

Display screen 54 preferably consists of a conventional audio/visual monitor system capable of displaying three-dimensional graphical information. The type of display screen 54 and video camera 56 used in the present invention is arbitrary and may be chosen based only upon the intended application of the system of the present invention.

In a more preferred embodiment of the system for constructing three-dimensional images using camera-based gesture inputs of the preferred embodiment, video display screen 34 is a rear-projection Ikegami TPP 1000/1500® projector with a Retroscan RS125SW® screen (six feet in height in the y direction and eight feet in width in the x direction); interaction area 52 is an eleven feet (in the z direction) by twelve feet (in the x direction) area in front of video display screen 54; and video camera 56 is a Sony® NTSC video camera.

Figure 4:
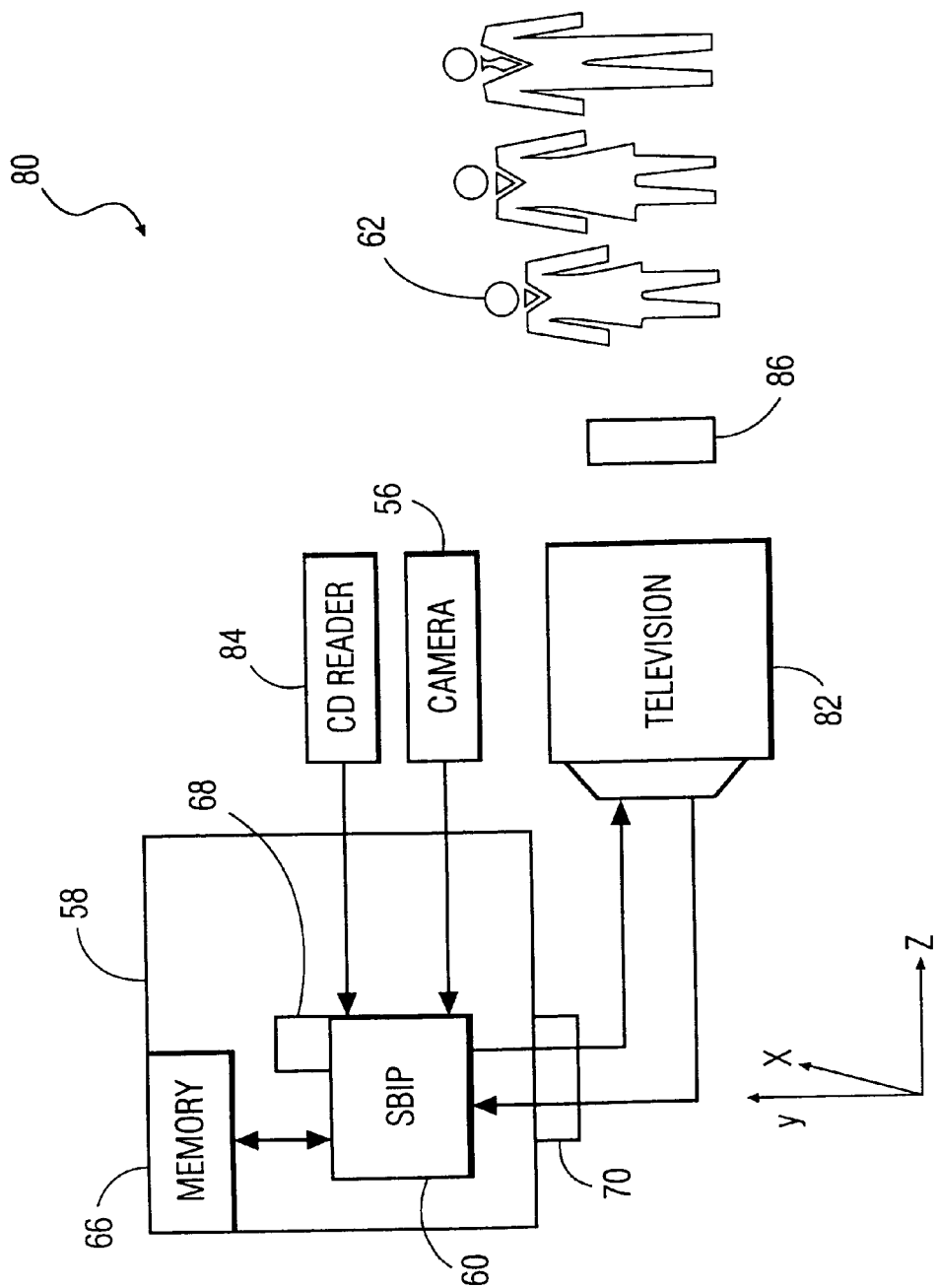
FIG. 4 is a block diagram of a system for constructing three-dimensional images using camera-based gesture inputs of users in accordance with another preferred embodiment of the present invention.

An alternate embodiment of the system for permitting three-dimensional navigation through a virtual reality environment using camera-based gesture inputs of the present invention is shown in FIG. 4. As shown, the alternate embodiment 80 comprises a video camera 56 and computer 58 with SBIP 60 and computer-readable memory 66 similar to those described with reference to FIG. 3. However, the alternate embodiment further comprises a compact disc reader 84 capable of reading an application program encoded on a CD ROM and providing such application program to SBIP 60. The alternate embodiment also comprises a remote controller 86 for controlling features of the application program. Furthermore, in contrast to the display screen of the embodiment shown in FIG. 3, the alternate embodiment includes a conventional television display 82 capable of receiving video signals from SBIP 60 and transmitting information to SBIP 60.

B. Description of the System Software of the Preferred Embodiments

In accordance with the preferred embodiments of the present invention, the software for mapping two-dimensional image features of system users and an interactive area onto three-dimensional locations within the interactive area, as well as the applications programs for use with the preferred embodiments, will now be described. For ease of reference, the software and applications programs are described with reference to a single system user. However, it is to be understood that the camera-based gesture recognition technology of the present invention can be used with multiple users by identifying each user individually and interacting with each user accordingly.

Figure 2:
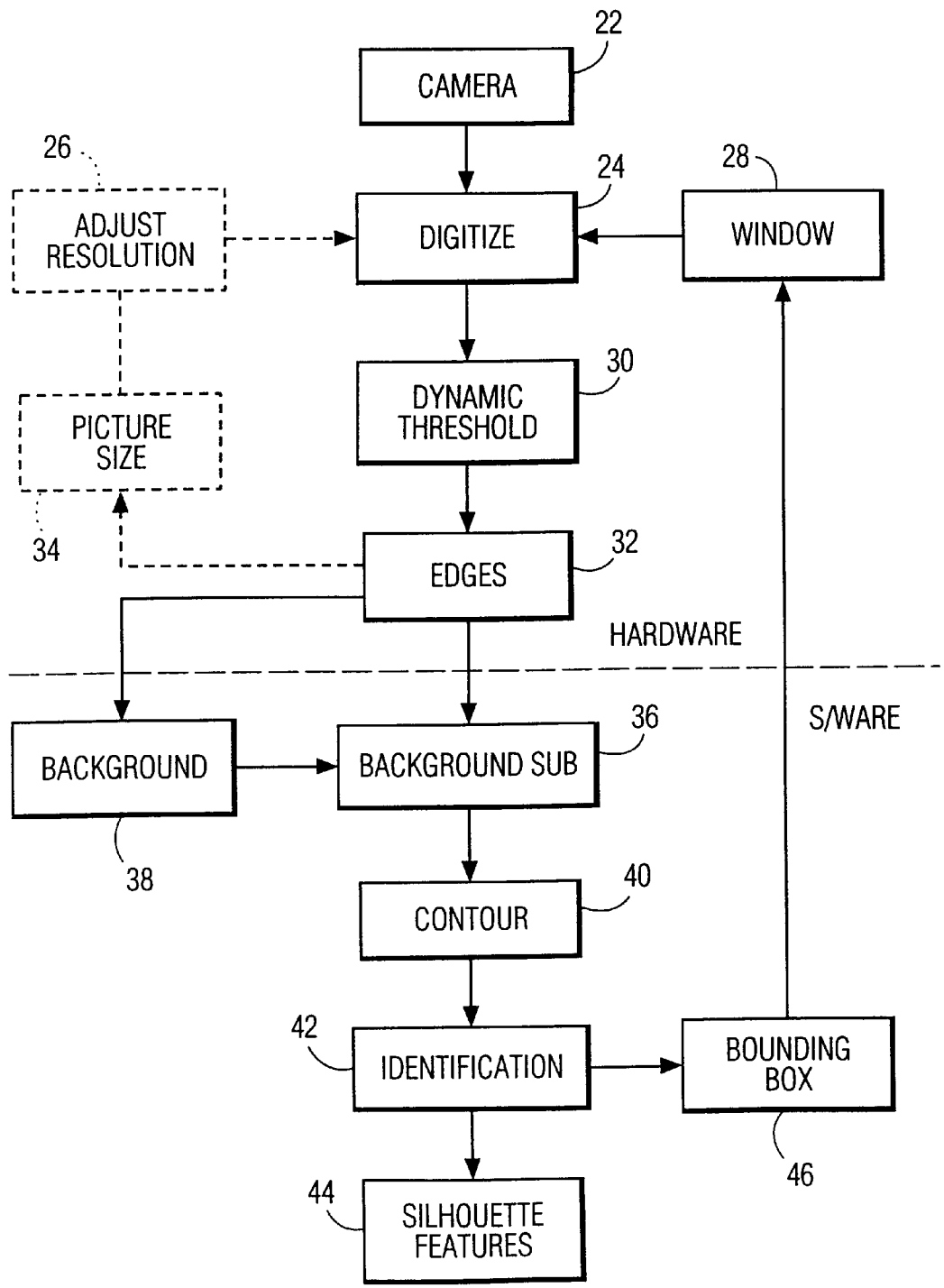
FIG. 2 is a flowchart showing the steps involved in a conventional software process for extracting two-dimensional images using silhouettes of users.
Figure 5:
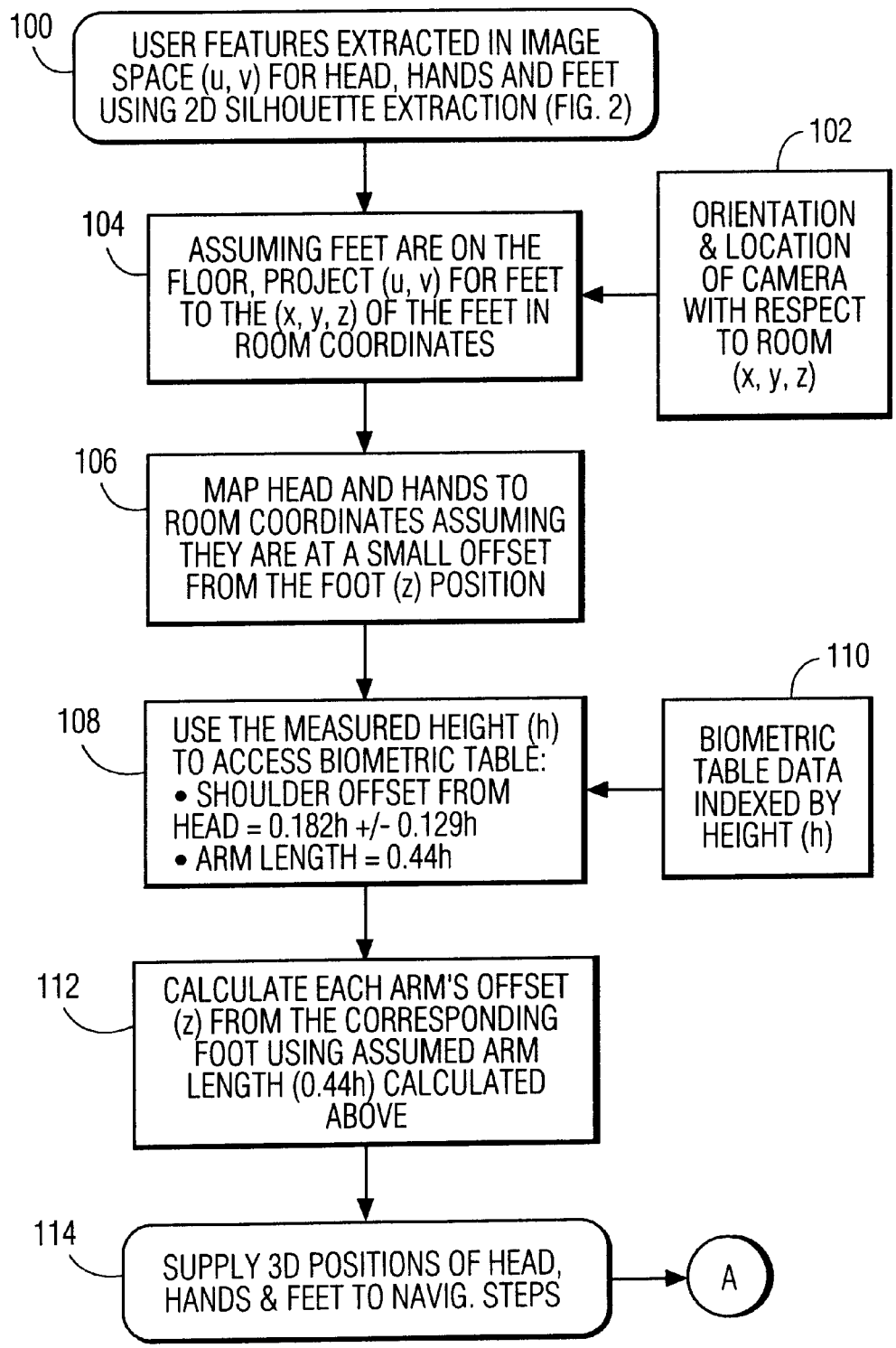
FIG. 5 is a flowchart showing the steps involved in a software process for mapping two-dimensional image features of users and an interactive area onto three-dimensional locations within the interactive area in accordance with the preferred embodiments of the present invention shown in FIGS. 3 and 4.

FIG. 5 is a flowchart showing the steps involved in the software process for mapping two-dimensional image features of a system user 62 onto three-dimensional locations in the room where system user 62 is located in accordance with the preferred embodiments of the present invention shown in FIGS. 3 and 4. The three-dimensional imaging software may be permanently encoded within computer-readable memory 66 or may be temporarily encoded in memory 66 via a diskette, CD ROM, or similar memory storage means. As shown, the three-dimensional imaging software process comprises a first step 100 of extracting the two-dimensional head, hands and feet features of a user in image space coordinates (u, v) using the two-dimensional extraction process shown in FIG. 2. Coordinates (u, v) correspond to the two-dimensional x-y plane of the user in front of video camera 56. The three-dimensional imaging process further comprises a step 102 of reading the orientation and location of video camera 36 in three-dimensional coordinates (x, y, z) with respect to the room. Assuming the user's feet are on the floor, at step 104 the software process projects the two-dimensional, extracted features of the user's feet to three-dimensional coordinates (x, y, z) of the user's feet, using the (x, y, z) orientation of camera 56 with respect to the room.

At step 106, the software process projects the two-dimensional, extracted features of the user's head and hands to three-dimensional coordinates (x, y, z) of the user's head and hands, assuming that the head and hands are slightly offset from the position of the feet in the z direction and using the (x, y, z) orientation of camera 56 with respect to the room.

Figure 8:
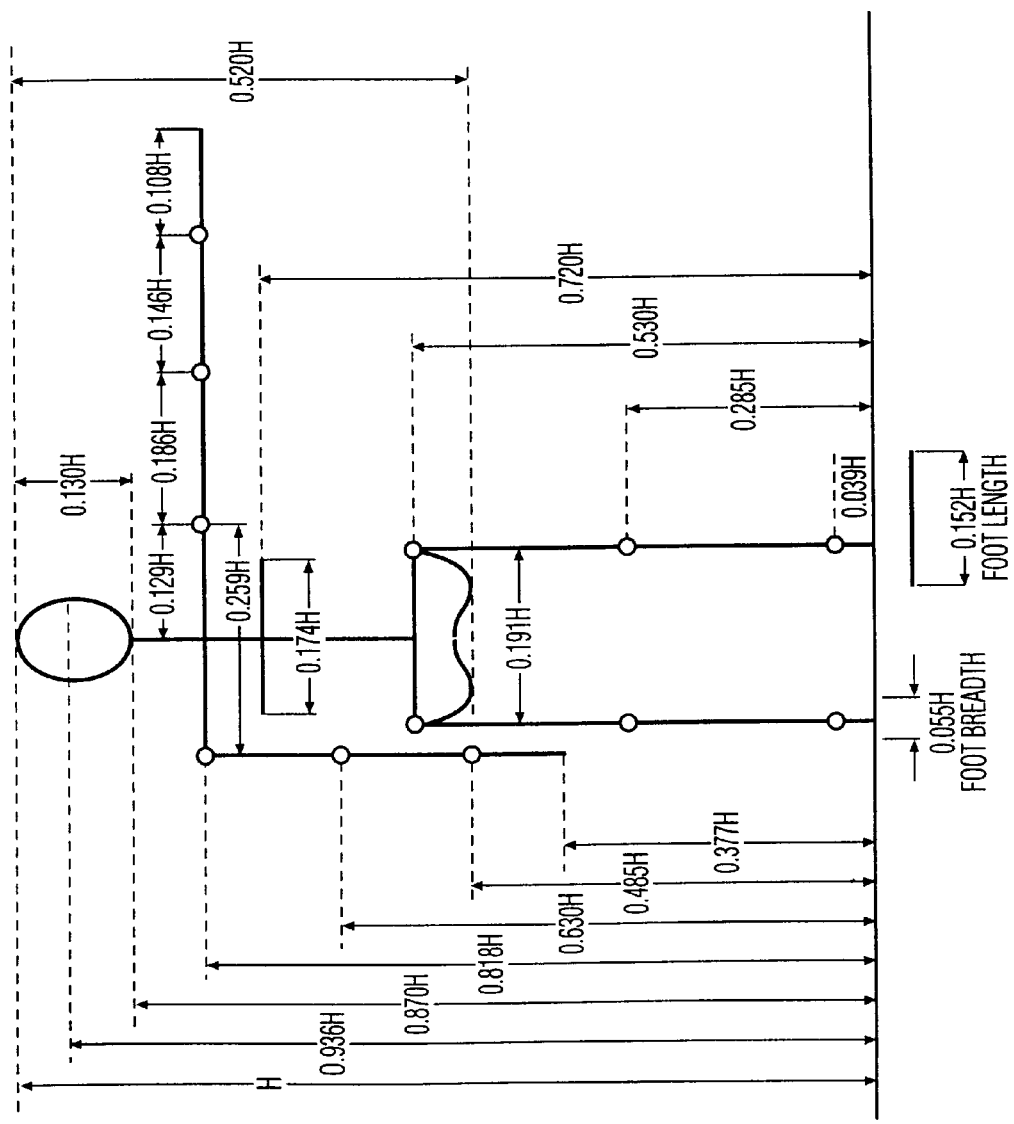
FIG. 8 is a biometric data table showing the length of body parts as a ratio of the body height (H), wherein the body height (H) is the height of a standing person.

The three-dimensional imaging process further comprises a step 108 of using the measured height (h) of the user to access a biometric data (shown at step 110) indexed by height and stored within computer-readable memory 66. An example of a biometric data table capable of use with the present invention is shown in FIG. 8. The present invention is not limited by the biometric data shown in FIG. 8, since other biometric data may be utilized as set forth in D. Chaffin & G. Andersson, *Occupational Biomechanics*, 2d ed. (1991), L. Farkas, *Anthropometry of the Head and Face*, 2d ed. (1994), and N.A.S.A., *Anthropometric Source Book*, vols. 1–3 (1978). The three-dimensional imaging process assumes that the user's shoulders are offset from the top of the user's head to the bottom of the user's neck by a distance of 0.182 h in the y-direction, and that the shoulder width from the center of the user's back to the end of the shoulder blade is 0.129 h in the x direction, wherein h is the user's height. The imaging process further assumes that the user's arm length is 0.44 h, and utilizes the assumed arm length (0.44 h) until a measured arm length greater than 0.44 h is extracted by video camera 56. The software process further comprises a step 112 of calculating each arm's offset in the z direction from the corresponding foot, using the assumed arm length (0.44 h) calculated in step 108. At step 112, each arm's actual length in the z direction is calculated from the assumed arm length using the principle of foreshortening. The software process comprises a final step 114 of supplying the three-dimensional positions of the user's head, hands and feet to an application program.

Figure 6:
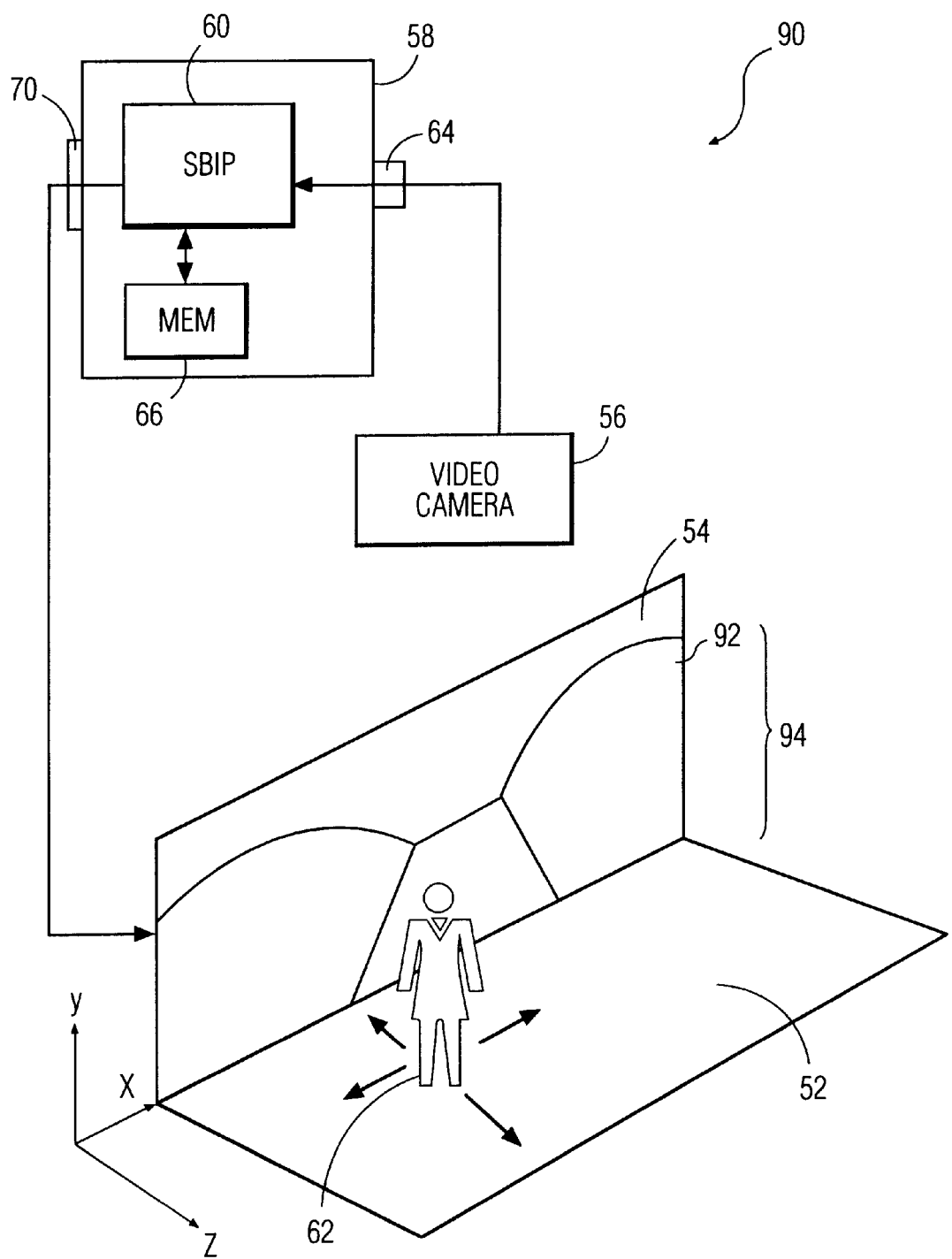
FIG. 6 is a block diagram showing a system for permitting three-dimensional navigation through a virtual reality environment using camera-based gesture inputs of the present invention using the system for constructing three-dimensional images shown in FIG. 3.

FIG. 6 is a block diagram showing the system 90 for permitting navigation through a virtual reality environment using camera-based gesture inputs and the system for constructing three-dimensional images shown in FIG. 3. As shown in FIG. 6, a user 62 of the navigation system stands in front of video display screen 54 displaying graphical images 92 of a virtual reality environment 94. Video camera 56 views user 62 and SBIP 60 processes data received from camera 56 by extracting the three-dimensional image of user 62 and by identifying user body motions, such as the three-dimensional positions of the user's head, hands, legs, feet, etc., as described above.

Thus, the system shown in FIG. 6 incorporates the advantages of both the immersive and non-immersive approaches to displaying and interacting with a virtual reality environment. The navigation system of the present invention utilizes the non-immersive concepts of displaying the virtual reality environment on a stationary display, and of not mounting special equipment on the user's body to read body motions. The navigation system of the present invention also utilizes the immersive concept of employing the user's body motions to control the motion of and interaction with the virtual reality environment. A large-screen display is preferably used so that the user sees a life-size rendering of the virtual environment, and the display covers a large portion of the user's field of vision.

The present invention permits navigation through virtual reality environment 94 as follows. When user 62 walks in front of display screen 54, SBIP 60 computes the location where user 62 is standing. By taking a step forward, user 62 causes SBIP 60 to move graphical images 92 on display screen 54 so that user 62 appears to be moving forward through virtual reality environment 94. Similarly, by stepping left or right, user 62 causes SBIP 60 to move graphical images 92 so that user 62 appears to be moving left or right through virtual reality environment 94. SBIP 60 stops the movement of graphical images 92 when user 62 takes a step backwards. If user 62 takes a second step backwards, SBIP 60 moves graphical images 92 in the reverse direction so that user 62 appears to be moving backwards through virtual reality environment 94.

Additional gestures may be used with the navigation system 90 of the present invention to enhance flexibility. For example, if user 62 raises his/her right hand, SBIP 60 causes graphical images 92 to rotate at a fixed rate in a clockwise direction so that user appears to rotate clockwise in virtual reality environment 94. By lowering his/her right hand, user 62 instructs SBIP 60 to stop rotation, wherein SBIP 60 causes graphical images 92 to cease rotating. User 62 may use his/her left hand in a similar fashion to start or stop apparent counter-clockwise rotation in virtual reality environment 94. Further, if user 62 bends at the waist, SBIP 60 causes graphical images 92 to rotate so that a virtual image of the ground in front of user 62 can be seen. The navigation system 90 of the present invention may also be provided with the following additional gestures: (1) graphical objects could be picked up when user 62 reaches his/her hand in the direction of the graphical objects; (2) the "picked-up" graphical objects could be manipulated by user gestures such as pushing, moving, etc.; and (3) left and right leg motions could be identified to permit user 62 to "walk" through the virtual reality environment.

Finally, the navigation system of the present invention could be extended to handle a team of users, wherein majority rules could be employed to govern motion so that the system goes in the direction indicated by the majority of the users. Alternatively, multi-user interaction could be handled on an individual basis, allowing different users to simultaneously select graphical objects in the virtual reality environment and interact with them. For example, in a video game application, such an arrangement would permit different users to fight one-on-one with a team of virtual opponents.

Figure 7:
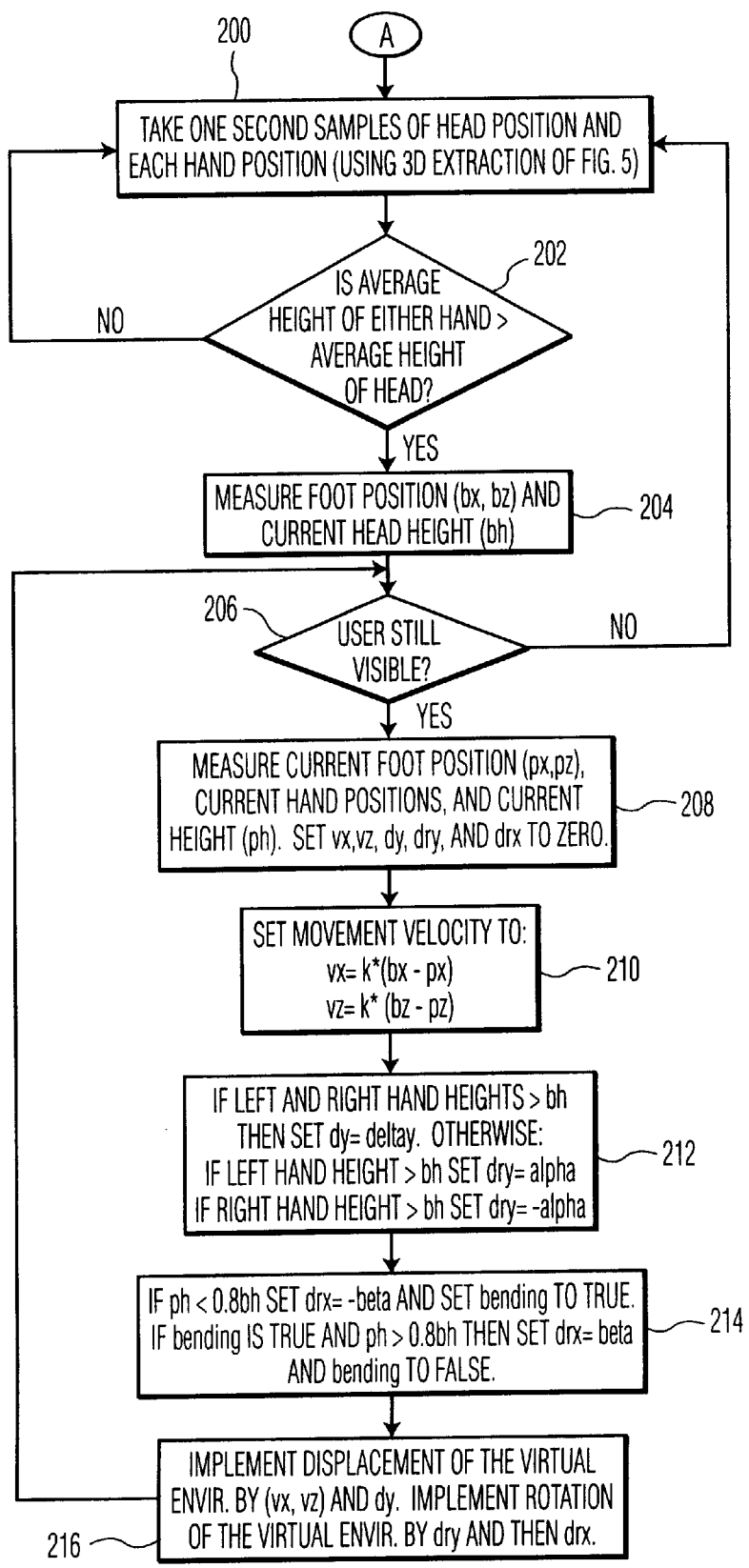
FIG. 7 is a flowchart showing the steps involved in a software process for use with the system for permitting three-dimensional navigation through a virtual reality environment using camera-based gesture inputs of the present invention shown in FIG. 6.

FIG. 7 is a flowchart showing the steps involved in a software process for use with the system for permitting three-dimensional navigation through a virtual reality environment using camera-based gesture inputs of the present invention shown in FIG. 6. The process comprises a step 200 of using the extracted, three-dimensional data of the system user (provided from process of FIG. 5) to take one-second samples of the user's head and hands positions. The process further comprises a step 202 of determining whether the average height of either hand (average hand height being determined from the one-second samples) is greater than the average height of the user's head (average head height being determined from the one-second samples). If the average height of either hand is not greater than the average height of the head, the process returns to step 200. However, if the average height of either hand is greater than the average height of the head, the process proceeds to step 204 where the user's foot position (bx, bz) and current head position (bh) are measured.

The process further comprises a step 206 for determining whether the user is still visible. If the user is not visible, the process returns to step 200. If the user is visible, the process proceeds to step 208 where the current foot position (px, pz), current hand positions, and current height (ph) are measured, and variables for the movement velocity (vx and vz), height variable to determine if the user is bending (dy), and rotational movement (dry and drx) are set to zero. The process comprises a next step 210 of setting the movement velocity according to the following formulas: (1) vx=k*(bx−px) and (2) vz=k*(by−pz), wherein (k) is an input to the system that determines the speed with which user moves around the virtual reality environment, e.g., system movement becomes faster as (k) increases. Preferably, (k) is a value from 0.3 to 1.0. At the next step 212 of the process, the height variable (dy) is set to a dummy variable (deltay) if both hand heights are greater than head height (bh). Otherwise, at step 212, if only the left hand height is greater than head height (bh), then rotational movement (dry) is set to alpha, wherein alpha indicates that counter-clockwise rotation of the virtual reality environment is desired. Preferably alpha is set to +1.0 degrees. If only the right hand height is greater than head height (bh), then rotational movement (dry) is set to (−alpha), wherein (−alpha) indicates that clockwise rotation of the virtual reality environment is desired and is preferably −1.0 degrees. Alpha and beta determine the speed of rotation of the virtual reality environment, since the environment may be rotated every iteration based on the loop time of the iteration. Preferably, the system is operating at 10 Hz meaning that the 10 iterations occur per second.

The process further comprises a step 214 of setting rotational movement (drx) to a dummy variable (−beta) and a variable (bending) to "TRUE" if the current height (ph) is less than 80% of the current head height (bh), wherein (−beta) indicates rotation of the virtual reality environment to see the ground in front of the user, and (bending) indicates that user is bending. Preferably (−beta) is set to −2.0 degrees. However, if (bending) is "TRUE" and the current height (ph) is greater than 80% of the head height (bh), then rotational movement (drx) is set to (beta) and (bending) is set to "FALSE," wherein (beta) indicates rotation opposite to (−beta). Preferably, (beta) is set to +2.0 degrees. The process comprises a final step 216 of implementing displacement of the virtual reality environment by (vx), (vz), and (dy), and implementing rotation of the virtual reality environment by (drx) and (dry) on the video display screen. After step 216, the process returns to step 206 to determine if the user is still visible.

C. Examples of Application Programs for Use With the Preferred Embodiments

The invention will be further clarified by the following examples of application programs capable of use with the system and method for constructing three-dimensional images using camera-based inputs of the present invention. The application programs are intended to be purely exemplary of the uses of the preferred embodiments of the present invention, and are not intended to limit the scope of the broad features of the invention. The preferred embodiments of the present invention can be used with any application requiring calculation of a three-dimensional position of a user so that the user may manipulate graphical computer-generated objects in three dimensions. Examples of application programs include an information wall for multiple-user interaction, a telecommunications application, a gesture-based remote control, and a home exercise and entertainment application.

1. Information Wall for Multiple User Interaction

An information wall application program may use the system and method for navigating through virtual reality of the present invention. The information wall comprises a large, notice board-like display screen with which multiple users can interact, providing a highly intuitive and interactive information system. Such an application is preferably deployed in shopping malls, museums, libraries, galleries, and other similar environments.

For example, in a shopping mall the information wall would allow shoppers entering the mall to simply stand within a certain distance of the wall to activate it. The information wall then displays an overall map of the mall at the position and height of the person standing in front of it. A number of information icons are displayed around the map from which the shopper can select by pointing. By pointing at the icons, the information wall displays various pieces of information, such as, the location of certain stores and rest-rooms, and so forth. The information wall may also support forms of advertising. For example, by pointing at a store on the map, the shopper could display a short video sequence describing the products and service offered by the store. The information wall may also permit the display to follow the user as he/she walks along its length, pointing in the correct direction to enable a shopper to get where he/she wants to go.

2. Telecommunications Applications

The preferred embodiments of the present invention may also be used with telecommunications applications. Currently, bandwidth problems prevent consumer telecommunications via video. With the present invention users, can communicate via a shared virtual reality world, rather than via their actual environments. Only video from the user silhouette needs to be transmitted and shown in the virtual environment, wherein the preferred embodiments of the present invention extracts the user silhouette. This approach could be simplified even more by showing the users with computer-generated bodies (in the correct position and pose, since the present invention can determine that) and only video of the head region is transmitted.

Multi-user video conferencing may also be aided by the present invention. Currently, a user needs to pan and zoom the camera from user to user of a teleconference. The present invention could be used as part of a commercial teleconferencing system where the camera can be controlled by the gestures of the participants in the teleconference. For example, pointing at a participant causes the camera to focus on that participant, raising your hand attracts the camera to focus on you, etc.

3. Gesture-Based Remote Control

The preferred embodiments of the present invention could also be used as part of the infrastructure of an integrated home entertainment and communications system, replacing the functions currently provided by a remote control unit. For example, the user's position within the room, as well as user body pose and gestures, could all be accessed by the present invention. Pointing at a CD player could display the controls for the CD player on the television, and pointing at menu items on the television could select those items.

If more than one television (or display) is in the room, the position of the user could be used to determine which television is employed. If there are more than one user, it is also conceivable that the present invention could enable separate commands issued by different users, or construct a hierarchy of authority for the different commands.

Additionally, a conventional remote control could be used with the present invention, wherein the present invention simplifies the functionality of the remote control, e.g., so that it has only four buttons. With the present invention, a user could point the remote control at the CD player (or stand adjacent thereto), and the remote control would function as a CD player remote. Alternatively, the user could sit in front of the television and the remote control would function as a channel changer. Finally, the remote control could be used to establish a hierarchy of authority wherein the preferred embodiments of the present invention will respond only to the user holding remote control.

4. Home Exercise and Entertainment Applications

The preferred embodiments of the present invention could also be used to support home exercise CD ROM programs, wherein the user buys his/her own celebrity trainer. The present invention would provide the location of the user in a room to the home exercise program so that the trainer will always look in the direction of the user. The present invention could also determine when the user stops exercising in the middle of an exercise, so that the trainer can recommend an alternate exercise regimen. It is also possible for the trainer to critique the way a user is exercising and offer helpful information.

An additional feature of the home exercise application would be to combine video input of the user with the graphically-generated image of the trainer and display both on a television. Such a feature gives the user the advantage of seeing themselves in action, and permits the trainer to point or touch portions of the video image of the user so to impart advice, e.g., lift your leg this higher. Other exercise applications such "virtual" jogging, educational applications such as learning to dance in virtual reality, and entertainment applications such as interactive games may also be used with the preferred embodiments of the present invention.

It will be apparent to those skilled in the art that various modifications and variations can be made in the system and method for constructing three-dimensional images using camera-based gesture inputs of the present invention and in construction of this system without departing from the scope or spirit of the invention. As an example, the system and method could be used with other application programs which require three-dimensional construction of images and users, and require interaction between the users and three-dimensional images. Further, CD reader 84 and remote 86 of the system shown in FIG. 4 may be used with the system shown in FIG. 3. Finally, audio features may be incorporated into the preferred embodiments to provide voice-recognized commands from the system user and sound effects to the display screen.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for permitting three-dimensional navigation through a virtual reality environment using camera-based gesture inputs of a user of the system, comprising:

a computer-readable memory means;

means for generating video signals indicative of the gestures of the system user and an interaction area surrounding the system user;

means for displaying video images, the video image display means being positioned in front of the system user; and means for processing the video signals, in accordance with a program stored in the computer-readable memory means, to determine the three-dimensional positions of the body and principle body parts of the system user, wherein the video signal processing means constructs three-dimensional images of the system user and interaction area on the video image display means based upon the three-dimensional positions of the body and principle body parts of the system user, the video image display means displays three-dimensional graphical objects within the virtual reality environment, and movement by the system user permits apparent movement of the three-dimensional objects displayed on the video image display means so that the system user appears to move throughout the virtual reality environment, wherein when the system user raises his/her hand, the video signal processing means rotates the three-dimensional graphical objects on the video image display means in one of a clockwise and a counterclockwise direction so that the system user appears to be rotating accordingly through the virtual reality environment; and when the system user lowers his/her hand the rotation stops.

2. A system for permitting three-dimensional navigation through a virtual reality environment using camera-based gesture inputs of a user of the system, comprising:

a computer-readable memory means;

means for generating video signals indicative of the gestures of the system user and an interaction area surrounding the system user;

means for displaying video images, the video image display means being positioned in front of the system user; and means for processing the video signals, in accordance with a program stored in the computer-readable memory means, to determine the three-dimensional positions of the body and principle body parts of the system user, wherein the video signal processing means constructs three-dimensional images of the system user and interaction area on the video image display means based upon the three-dimensional positions of the body and principle body parts of the system user, the video image display means displays three-dimensional graphical objects within the virtual reality environment, and movement by the system user permits apparent movement of the three-dimensional objects displayed on the video image display means so that the system user appears to move throughout the virtual reality environment, wherein when the system user bends at the waist, the video signal processing means rotates the three-dimensional graphical objects on the video image display means so that three-dimensional graphical objects in front of the system user can be seen by the system user.

3. A method for permitting three-dimensional navigation through a virtual reality environment, the method comprising the steps of:

generating video signals indicative of the gestures of the system user and an interaction area surrounding the system user;

processing the video signals to determine the three-dimensional positions of the body and principle body parts of the system user;

constructing three-dimensional images of the system user and interaction area based upon the three-dimensional positions of the body and principle body parts of the system user; and displaying three-dimensional graphical objects within the virtual reality environment, wherein movement by the system user permits apparent movement by the three-dimensional objects displayed so that the system user appears to move throughout the virtual reality environment, wherein when the system user raises his/her hand, rotating the displayed three-dimensional graphical objects so that the system user appears to be rotating through the virtual reality environment.

4. A method for permitting three-dimensional navigation through a virtual reality environment as recited in claim 3, wherein when the system user lowers his/her hand the rotation stops.

5. A method for permitting three-dimensional navigation through a virtual reality environment using camera-based gesture inputs of a user of a computer system, the method comprising the steps of:

generating video signals indicative of the gestures of the system user and an interaction area surrounding the system user;

processing the video signals to determine the three-dimensional positions of the body and principle body parts of the system user including the system user's leg;

constructing three-dimensional images of the system user and interaction area based upon the three-dimensional positions of the body and principle body parts of the system user; and displaying three-dimensional graphical objects within the virtual reality environment, wherein movement by the system user's leg permits apparent movement by the three-dimensional objects displayed on the video image display so that the system user appears to move throughout the virtual reality environment, wherein when the system user bends at the waist, rotating the three-dimensional graphical objects displayed so that three-dimensional graphical objects in front of the system user can be seen by the system user.

* * * * *